United States Patent
Harata et al.

(10) Patent No.: US 7,497,132 B2
(45) Date of Patent: *Mar. 3, 2009

(54) MAGNETOSTRICTIVE TORQUE SENSOR AND ELECTRICALLY POWERED STEERING APPARATUS USING SAME

(75) Inventors: Hitoshi Harata, Haga-machi (JP); Mizuho Doi, Haga-machi (JP); Hitoshi Karasawa, Haga-machi (JP); Tomohiro Hoshi, Haga-machi (JP); Yukiya Kashimura, Haga-machi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/542,142

(22) Filed: Oct. 4, 2006

(65) Prior Publication Data
US 2007/0074589 A1 Apr. 5, 2007

(30) Foreign Application Priority Data
Oct. 5, 2005 (JP) ............................. 2005-293030

(51) Int. Cl.
*G01L 3/00* (2006.01)
(52) U.S. Cl. ................................. 73/862.335
(58) Field of Classification Search ................. 73/862.331–862.338
See application file for complete search history.

(56) References Cited

U.S. PATENT DOCUMENTS 4,989,460 A * 2/1991 Mizuno et al. ......... 73/862.335
6,966,232 B2 * 11/2005 Asaumi et al. ......... 73/862.333
6,978,686 B2 * 12/2005 Shimizu et al. ........ 73/862.335
2002/0117348 A1 8/2002 Shimizu et al.
2006/0042404 A1 * 3/2006 Shimizu et al. ........ 73/862.331

FOREIGN PATENT DOCUMENTS

| JP | 61-245033 B2 | 10/1986 |
| JP | 2002-082000 A | 3/2002 |

\* cited by examiner

*Primary Examiner*—Harshad Patel
*Assistant Examiner*—Octavia Davis
(74) *Attorney, Agent, or Firm*—Arent Fox LLP

(57) ABSTRACT

A magnetostrictive torque sensor comprising a first magnetostrictive film, a second magnetostrictive film, and a third magnetostrictive film formed over the entire circumferential periphery of a surface of a rotating shaft. A first sensor coil, a second sensor coil, and a third sensor coil for sensing changes in impedance are provided for the first, second, and third magnetostrictive films, respectively. Signals according to the changes in impedance outputted from the first through third sensor coils are inputted to a torque calculating unit. The torque calculating unit calculates the torque applied to the rotating shaft on the basis of the output signal from the first sensor coil and the output signal from the second sensor coil. Furthermore, the output signals from the first through third sensor coils are compared, and failures in the first magnetostrictive film or the second magnetostrictive film are detected by a failure detector.

6 Claims, 7 Drawing Sheets

MAGNETOSTRICTIVE TORQUE SENSOR AND ELECTRICALLY POWERED STEERING APPARATUS USING SAME

FIELD OF THE INVENTION

The present invention relates to a magnetostrictive torque sensor and an electrically powered steering apparatus that uses the same, and particularly relates to a magnetostrictive torque sensor comprising a structure and a function whereby failures in magnetostrictive films can be detected; and to an electrically powered steering apparatus manufactured using this sensor.

BACKGROUND OF THE INVENTION

In an electrically powered steering apparatus used as a steering system for an automobile, for example, a steering torque sensor commonly senses the steering torque applied to a steering shaft from a steering wheel by the steering operation of the driver. The steering torque sensor is normally configured from a magnetostrictive torque sensor. The steering shaft functions as a rotating shaft rotated by the rotational force from a steering operation. The steering shaft constitutes the rotating shaft in the steering torque sensor. The electrically powered steering apparatus controls the driving of a steering force auxiliary motor according to a torque signal detected from the steering torque sensor, and reduces the steering force for the driver to provide a pleasant steering feel.

As described above, magnetostrictive torque sensors are well known as steering torque sensors used in electrically powered steering apparatuses. In such a magnetostrictive torque sensor, magnetostrictive films 102A, 102B that have inverse magnetic anisotropy 103, 104 with respect to each other are formed at two specific upper and lower locations on, e. g., the surface of the steering shaft (also referred to as the rotational shaft) 101, as shown in FIG. 12. The magnetostrictive torque sensor 100 has a configuration in which a non-contact system is used in which sensor coils 106A, 106B sense changes in the magnetostrictive characteristics of the magnetostrictive films 102A, 102B that correspond to the torsion of the steering shaft 101. The changes are sensed when an input torque is applied to the steering shaft 101 from the steering wheel, as shown by the arrow 105.

FIG. 13 shows the principle of input torque sensing in the sensor configuration of the magnetostrictive torque sensor 100. The characteristic VT1 represents an input torque/output characteristic obtained based on an output signal from the sensor coil 106A. The characteristic VT2 represents an input torque/output characteristic obtained based on an output signal from the sensor coil 106B. The slopes of the characteristics VT1 and VT2 are opposite each other because the directions of magnetic anisotropy 103, 104 of the magnetostrictive films 102A, 102B are opposite. The characteristic VT3 represents an input torque/output characteristic created by using the characteristics VT1 and VT2 and finding the difference between the two. The input torque applied to the steering shaft can be determined based on the characteristic VT3. In practice, point B of the characteristic VT3 is set as the origin, the part to the right is set as the positive region, and the part to the left is set as the negative region. Information about the rotating direction and extent of the input torque can be obtained from this characteristic VT3.

In the process for manufacturing the magnetostrictive torque sensor 100, it is necessary to perform a step in which magnetostrictive films 102A, 102B (in a wider sense, magnetostrictive regions) are formed over a specific surface of part of the steering shaft 101; i.e., over the entire circumferential surface of a specific axial width in the columnar rotating shaft 101, and these magnetostrictive films are then provided with magnetic anisotropy 103, 104. Conventional methods for providing magnetostrictive films with magnetic anisotropy in the manufacture of a magnetostrictive torque sensor 100 involve applying a twisting torque to a rotating shaft on which magnetostrictive platings (magnetostrictive films) are formed, e.g., by an electroplating process, thus creating stress in the circumferential surface of the rotating shaft. This is followed by heat treating the rotating shaft in a thermostat while the shaft is kept under stress (see Japanese Laid-open Patent Application No. 2002-82000, for example).

Magnetostrictive torque sensors have required that the inverse magnetostrictive characteristics created by magnetic anisotropy in the magnetostrictive films formed on the rotating shaft be maintained over a long period of time. However, with conventional magnetostrictive torque sensors, the magnetostrictive films have typically been formed over the entire circumferential surface of the columnar rotating shaft by electroplating. Therefore, moisture sometimes adheres to the plated parts, which are the magnetostrictive films, causing corrosion or peeling, or the magnetostrictive films are corroded or caused to peel by external causes, thereby causing the magnetostrictive films to fail.

In a conventional magnetostrictive torque sensor, it has been impossible to reliably detect failures in the magnetostrictive films. The reason for this is because when a change occurs in sensor output, it has been impossible to determine whether the change is based on a change in the surrounding temperature, a change in the input torque, or a failure in the magnetostrictive films.

Since it has been impossible to detect failures in the magnetostrictive films of a conventional magnetostrictive torque sensor 100 as described above, one idea has been to use a sensor configuration such as is shown in FIG. 14, for example, to deal with failures in cases in which failures are assumed to have occurred. The sensor configuration shown in FIG. 14 is obtained by adding an identically structured magnetostrictive film configuration 107A to the rotating shaft 101 in a magnetostrictive film configuration 107 composed of the above-described magnetostrictive films 102A, 102B. Specifically, two sets of magnetostrictive films 102A, 102B are formed at intervals on the rotating shaft 101. According to this configuration, in cases in which the top set of magnetostrictive films has failed, the failure can be reliably detected because the sensor output value from the top set of magnetostrictive films differs from the sensor output value of the bottom set of magnetostrictive films. The idea is that failures in the magnetostrictive films can be detected by providing this double set of magnetostrictive films 102A, 102B.

However, if the sensor configuration shown in FIG. 14 is used, problems are raised in that an extremely long space is needed to provide the magnetostrictive films in the rotating shaft 101. The entire length L2 must currently be 96 mm because the magnetostrictive film width W1 must be 18 mm and the interval between the magnetostrictive films L1 must be 8 mm in order to ensure the ensure the required detection performance of the magnetostrictive films and to eliminate the effects that adjacent magnetostrictive films have on each other.

Recently, the width of the rotating shaft in the axial direction in an electrically powered steering apparatus for an automobile is currently limited to about 100 mm because of design considerations when a magnetostrictive film is formed by plating. It has also sometimes been difficult to ensure a width of 100 mm, depending on the type of vehicle. Consequently, in cases in which the axial film width is 96 mm as described above, it is difficult to use the magnetostrictive torque sensor in an electrically powered steering apparatus in practical terms.

Thus, a need has existed for minimizing the axial length of a steering shaft on which magnetostrictive films can be formed in order to be able to use a magnetostrictive torque sensor in many different types of vehicles.

Therefore, a need has existed for a magnetostrictive torque sensor, and also an electrically powered steering apparatus that uses this sensor, that has a simple configuration wherein it is possible to easily and reliably detect failures in the magnetostrictive films that sense an input torque and are formed on the rotating shaft, and wherein the space for forming the magnetostrictive films on the rotating shaft can be minimized.

SUMMARY OF THE INVENTION

According to an aspect of the present invention, there is provided a magnetostrictive torque sensor which comprises a rotating shaft rotated by the application of a torque; a first magnetostrictive film formed around the entire circumferential periphery of a surface of the rotating shaft; a second magnetostrictive film similarly formed around the entire circumferential periphery of a surface of the rotating shaft; a third magnetostrictive film having a different alloy composition than the first magnetostrictive film and second magnetostrictive film and being formed around the entire circumferential periphery of a surface of the rotating shaft; a first sensor coil, a second sensor coil, and a third sensor coil for sensing the impedances of the first magnetostrictive film, the second magnetostrictive film, and the third magnetostrictive film, respectively; torque calculating means for inputting a signal according to the change in impedance outputted from the first through third sensor coils, and calculating the torque applied to the rotating shaft on the basis of an output signal of the first sensor coil and an output signal of the second sensor coil; and a failure detector for comparing the output signals of the first through third sensor coils and detecting failures in the first magnetostrictive film or the second magnetostrictive film.

In the magnetostrictive torque sensor, the third magnetostrictive film that fulfills specific conditions is provided between the first magnetostrictive film and the second magnetostrictive film, for example, and can quickly and reliably sense at least the first or second magnetostrictive film by means of the failure detector on the basis of the state of the sensor signals pertaining to the impedances of the first through third magnetostrictive films.

Preferably, the first through third magnetostrictive films are formed from an Ni—Fe alloy. The Fe content of the alloy in the first magnetostrictive film and the second magnetostrictive film is 30 to 40 wt %, while the Fe alloy composition in the third magnetostrictive film is 15 to 25 wt %.

Desirably, the width of the third magnetostrictive film is less than the width of the first magnetostrictive film or the width of the second magnetostrictive film.

According to another aspect of the present invention, there is provided an electrically powered steering apparatus comprising a steering shaft; any of the above-described magnetostrictive torque sensors provided on the steering shaft for sensing a steering torque applied to the steering shaft; an electric motor for providing an auxiliary steering force to the steering shaft according to the steering torque sensed by the magnetostrictive torque sensor; and a control unit for controlling the driving of the electric motor on the basis of a signal pertaining to the steering torque sensed from the magnetostrictive torque sensor.

In the electrically powered steering apparatus, the configuration of the failure sensing means for detecting failures in the magnetostrictive films formed on the steering shaft of the magnetostrictive torque sensor can be simplified and made to require a narrow design space, the performance of the electrically powered steering apparatus can be improved, and the applicability of the electrically powered steering apparatus that has a failure-detecting function can be improved.

According to the present invention, it becomes possible to provide a magnetostrictive torque sensor with a magnetostrictive film configuration wherein magnetostrictive film failures can be detected using regions of smaller dimensions in the axial direction of the rotating shaft, and a magnetostrictive film failure sensing structure and function can be provided to a shorter rotating shaft than in conventional practice. In the electrically powered steering apparatus of the present invention, which is made using this magnetostrictive torque sensor as a steering torque sensor, a function to detect a failure in a magnetostrictive film can be provided to a steering shaft of lesser length, an electrically powered steering apparatus having the function to detect a failure in a magnetostrictive film can be installed regardless of the type of vehicle, and magnetostrictive film failures can be quickly dealt with.

BRIEF DESCRIPTION OF THE DRAWINGS

Certain preferred embodiments of the present invention will be described in detail below, by way of example only, with reference to the accompanying drawings, in which:

FIG. 11 is a graph showing the manner in which impedance $Z_A$, $Z_B$, or $Z_C$ varies with the input torque applied to the rotating shaft, for;

DETAILED DESCRIPTION OF THE PREFERRED EMBODIMENTS

Figure 1:
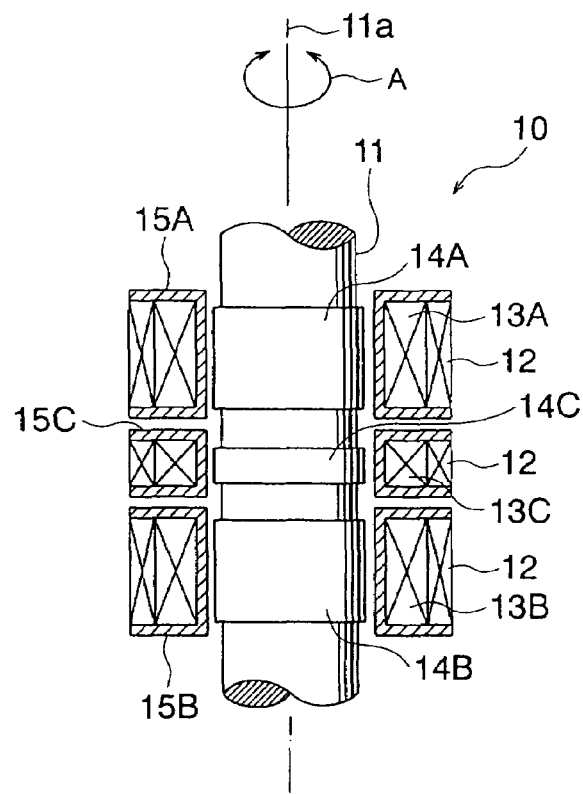
FIG. 1 is a partial cross-sectional side view showing the basic structure of the magnetostrictive torque sensor according to an embodiment of the present invention.
Figure 2:
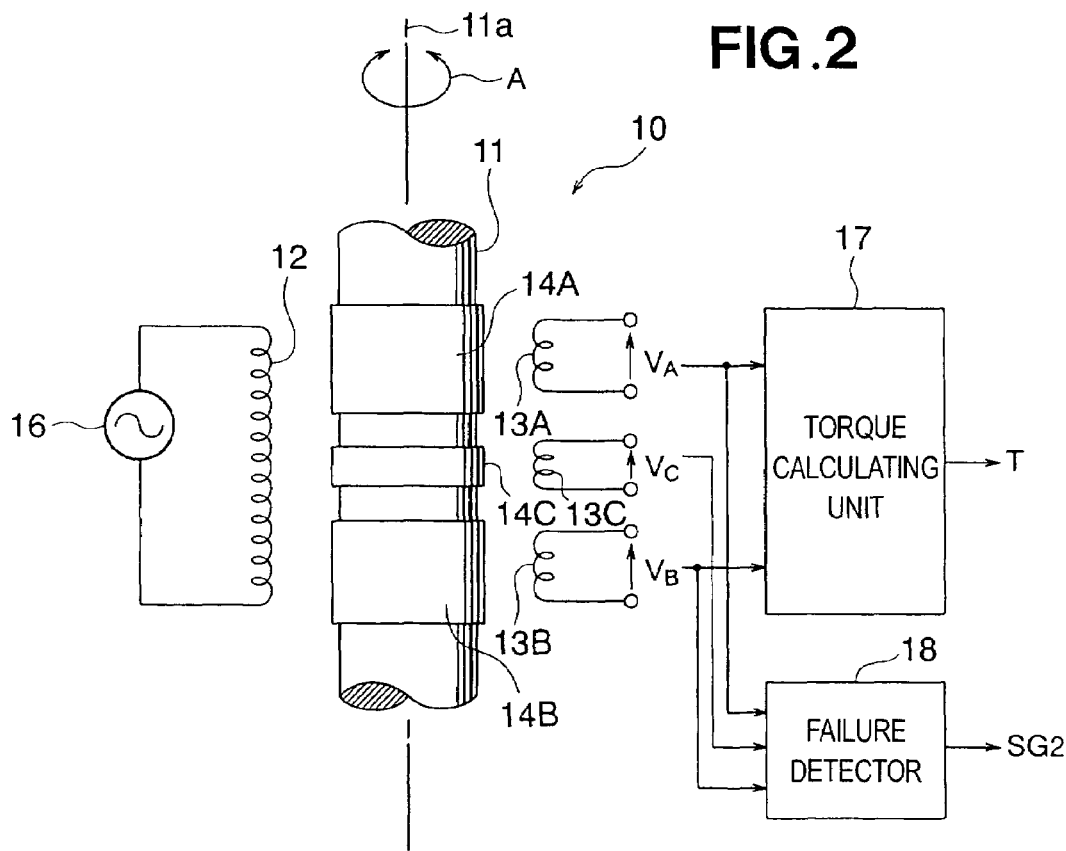
FIG. 2 is a side view schematically showing the basic configuration of the magnetostrictive torque sensor according to the present embodiment.
Figure 3:
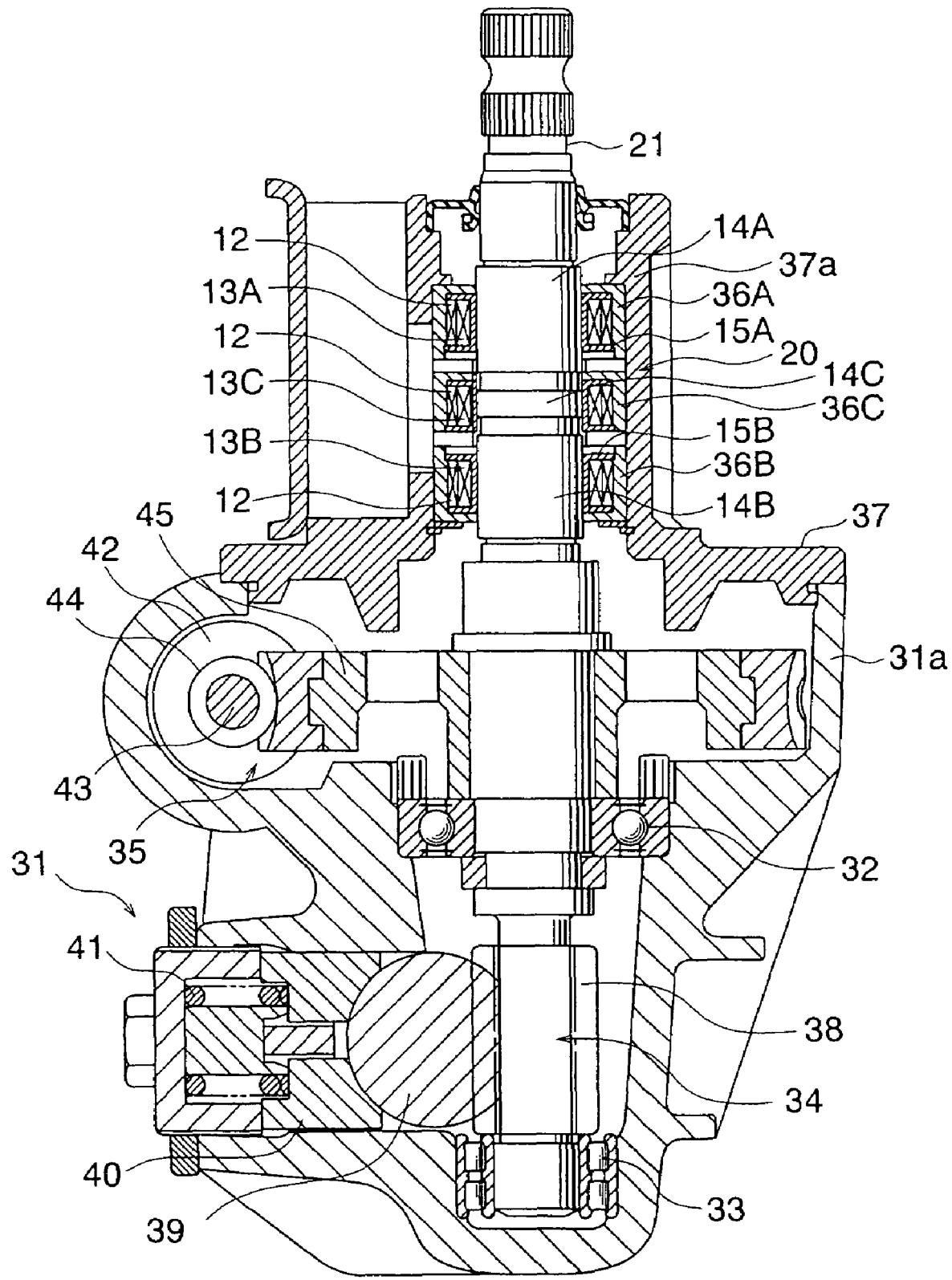
FIG. 3 is a longitudinal sectional view of the main section of a specific structure in which the magnetostrictive torque sensor according to the present invention is incorporated as a steering torque sensor into the steering shaft of an electrically powered steering apparatus.

First, the configuration of the magnetostrictive torque sensor will be described with reference to FIGS. 1 through 3. FIGS. 1 through 3 show a structural example of the magnetostrictive torque sensor according to the present invention.

A magnetostrictive torque sensor 10 is configured from a rotating shaft 11, and one excitation coil 12 and two sensor coils 13A, 13B, 13C disposed around the periphery of the rotating shaft 11, as shown in FIGS. 1 and 2. For the sake of convenience in the description, the rotating shaft 11 is shown without the top and bottom parts in FIGS. 1 and 2. When the magnetostrictive torque sensor 10 is used as a steering torque sensor in an electrically powered steering apparatus of an automobile, the rotating shaft 11 constitutes part of the steering shaft. This state is shown in FIG. 3.

The rotating shaft 11 has a columnar rod shape and is subjected to the rotational force (torque) of right-hand rotation (clockwise) or left-hand rotation (counterclockwise) around the axis 11a, as shown by the arrow A. The rotating shaft 11 is formed from a metal rod made of chromium-molybdenum steel (SCM) or the like, for example. First and second magnetostrictive films 14A, 14B are provided to the rotating shaft 11 at two locations aligned vertically in the axial direction, and a third magnetostrictive film 14C is provided between the two magnetostrictive films 14A, 14B. The magnetostrictive films 14A, 14B, 14C are formed over the entire circumferential periphery of the rotating shaft 11. The widths and intervals of the two magnetostrictive films 14A, 14B, 14C are set in the manner described below.

The magnetostrictive films 14A, 14B, 14C are preferably formed on the surface of the rotating shaft 11 as magnetostrictive plating parts. The films are formed by an electroplating from an Ni—Fe alloy. The magnetostrictive films 14A, 14B, which are magnetically anisotropic, are formed by processing the magnetostrictive plating parts (14A, 14B) so that magnetic anisotropy is obtained. Also, magnetic anisotropy does not need to be provided to the magnetostrictive film 14C. The method of creating the magnetostrictive films 14A, 14B, 14C is not limited to this option alone, however. The regions in which the magnetostrictive films are formed on the rotating shaft 11 should have specific magnetostrictive characteristics, and magnetostrictive regions not limited to magnetostrictive films can be formed.

In the magnetostrictive torque sensor 10, the width (magnetostrictive film width W1) of the magnetostrictive films 14A, 14B in the axial direction of the rotating shaft 11, and the width (magnetostrictive film width W2) of the magnetostrictive film 14C in the axial direction of the rotating shaft 11a, are set so as to fulfill conditions that are described later.

For the sake of convenience in the description, the terms "magnetostrictive films 14A, 14B" and "magnetostrictive plating parts (14A, 14B)" denote the same items, but are used for different purposes depending on the steps and conditions of manufacturing. In principle, the completed products obtained after magnetic anisotropy has been created are referred to as the "magnetostrictive films 14A, 14B," and the same parts prior to this step are referred to as "magnetostrictive plating parts."

The excitation coil 12 and the sensor coils 13A, 13B are provided both to the first and second magnetostrictive films 14A, 14B formed on the surface of the rotating shaft 11, as shown in FIG. 1. Specifically, the sensor coil 13A is disposed at an interposed gap around the magnetostrictive film 14A, as shown in FIG. 1. The substantially cylindrical ring-shaped sensor coil 13A encircles the entire periphery of the magnetostrictive film 14A. Also, the sensor coil 13B is disposed with an interposed gap from the periphery of the magnetostrictive film 14B. The sensor coil 13B similarly encircles the entire periphery of the magnetostrictive film 14B. Furthermore, a ring-shaped excitation coil 12 is disposed around the peripheries of the two sensor coils 13A, 13B. In FIG. 1, excitation coils 12 are illustrated as being provided separately to the magnetostrictive films 14A, 14B, but this is a depiction of two portions of what is actually one excitation coil 12. The sensor coils 13A, 13B and the excitation coil 12 are wound around the peripheral space around the magnetostrictive films 14A, 14B using ring-shaped supporting frames 15A, 15B that are provided to the periphery of the rotating shaft 11 so as to encircle the rotating shaft 11.

The sensor coil 13C and the excitation coil 12 are also provided around the third magnetostrictive film 14C so as to encircle the magnetostrictive film 14C at a gap. The third magnetostrictive film 14C is a magnetostrictive film for sensing failures in the magnetostrictive films 14A, 14B that are provided to sense input torque. The sensor coil 13C and the excitation coil 12 are wound around the peripheral space around the magnetostrictive film 14C using a ring-shaped supporting frame 15C that is provided to the periphery of the rotating shaft 11 so as to encircle the rotating shaft 11.

In FIG. 2, the excitation coil 12 and the sensor coils 13A, 13B are schematically shown in terms of their electrical relationship to the magnetostrictive films 14A, 14B of the rotating shaft 11. An AC power source 16 that constantly supplies an AC excitation current is connected to the excitation coil 12 shared by the magnetostrictive films 14A, 14B. Also, induced voltages $V_A$, $V_B$ corresponding to the torque to be sensed are outputted from the output terminals of the sensor coils 13A, 13B provided to the magnetostrictive films 14A, 14B, respectively. The excitation coil 12 and the sensor coil 13C are similarly disposed on the third magnetostrictive film 14C, and a voltage $V_C$ is outputted from the output terminal of the sensor coil 13C.

The induced voltages $V_A$, $V_B$ outputted from the output terminals of the sensor coils 13A, 13B are presented to a torque calculating unit 17. The torque calculating unit 17 computes the torque applied to the rotating shaft 11 on the basis of the induced voltages $V_A$, $V_B$, and outputs a signal (T) according to the torque. The torque calculating unit 17 is configured from either a microcomputer or another such computing means, or a computing electric circuit.

The induced voltages $V_A$, $V_B$, $V_C$ outputted from the output terminals of the sensor coils 13A, 13B, 13C are inputted to the failure detector 18. The failure detector 18 senses failures in the magnetostrictive films 14A, 14B on the basis of the induced voltages $V_A$, $V_B$, $V_C$, and outputs a failure signal SG2. The failure detector 18 is configured either from a microcomputer or another such computing means, or from a computing electric circuit. In the present embodiment, the failure detector 18 is provided within a control device to be described later.

In the above description, the relationship between the excitation coil 12 and the sensor coils 13A, 13B, 13C constitutes a relationship between the primary winding coil and secondary winding coil of a potential transformer.

The magnetostrictive films 14A, 14B, 14C formed on the surface of the rotating shaft 11 are magnetostrictive films formed by an electrolytic plating process using an Ni—Fe alloy, for example. The magnetostrictive films 14A, 14B are furthermore provided with magnetic anisotropy. The two magnetostrictive films 14A, 14B are formed so as to be inversely magnetically anisotropic to each other. When torque is applied to the rotating shaft 11 by a rotational force, the reverse magnetostrictive characteristics produced in the magnetostrictive films 14A, 14B are sensed using the sensor coils 13A, 13B disposed around the periphery of the magnetostrictive films 14A, 14B.

The following is a description, made with reference to FIG. 3, of a specific structure in which the magnetostrictive torque sensor 10 is incorporated as a steering torque sensor into the steering shaft of an electrically powered steering apparatus, for example. Elements in FIG. 3 that are substantially identical to those described in FIGS. 1 and 2 are denoted by the same numerical symbols.

FIG. 3 shows the specific configuration of a steering torque sensor 20, a supporting structure for a steering shaft 21, a rack-and-pinion mechanism 34, a power transmission mechanism 35, and a steering force auxiliary motor 42.

In FIG. 3, the top of the steering shaft 21 is joined to the steering wheel (not shown) of the vehicle. The bottom of the steering shaft 21 is configured so as to transmit steering force to a vehicle shaft comprising a rack shaft, via the rack-and-pinion mechanism 34. The steering torque sensor 20 provided at the top of the steering shaft 21 is configured using the magnetostrictive torque sensor 10. The steering torque sensor 20 corresponds to the magnetostrictive torque sensor 10, and the portion of the steering shaft 21 on which the magnetostrictive films 14A, 14B, 14C are formed corresponds to the rotating shaft 11.

The steering shaft 21 is rotatably supported by two shaft bearings 32, 33 in a housing 31a that forms a gear box 31. The rack-and-pinion mechanism 34 and the power transmission mechanism 35 are accommodated inside the housing 31a. The steering torque sensor 20 (corresponding to the magnetostrictive torque sensor 10) for the steering shaft 21 (corresponding to the rotating shaft 11) is provided to the upper side of the housing 31a. The above-described magnetostrictive films 14A, 14B are formed on the steering shaft 21, and the excitation coil 12 and sensor coils 13A, 13B, 13C corresponding to the magnetostrictive films 14A, 14B, 14C are supported by the supporting frames 15A, 15B, 15C and yokes 36A, 36B, 36C.

The top opening of the housing 31a is closed by a lid 37, and this lid 37 is fixed in place on the housing 31a by bolts (not shown). A pinion 38 provided at the bottom end of the steering shaft 21 is positioned between the shaft bearings 32, 33. A rack shaft 39 is guided by a rack guide 40 and is urged by a compressed spring 41 to press against the side of the pinion 38. The power transmission mechanism 35 comprises a worm gear 44 fixed on a transmission shaft 43 that is joined to the output shaft of the steering force auxiliary motor 42, and also comprises a worm wheel 45 fixed on the steering shaft 21. The steering torque sensor 20 is attached to the interior of a cylindrical part 37a of the lid 37.

The steering torque sensor 20 senses the steering torque applied to the steering shaft 21. The sensed value is inputted to a control apparatus (in FIG. 3, not shown) and is used as a reference signal for generating a suitable auxiliary steering torque in an electric motor 42.

When the steering torque from the steering wheel is applied to the steering shaft 21, the steering torque sensor 20 electrically senses changes in the magnetic characteristics of the magnetostrictive films 14A, 14B that correspond to the torsion in the steering shaft 21. The changes are sensed as changes in the induced voltages $V_A$, $V_B$, $V_C$ from the output terminals of the sensor coils 13A, 13B, 13C.

Figure 4:
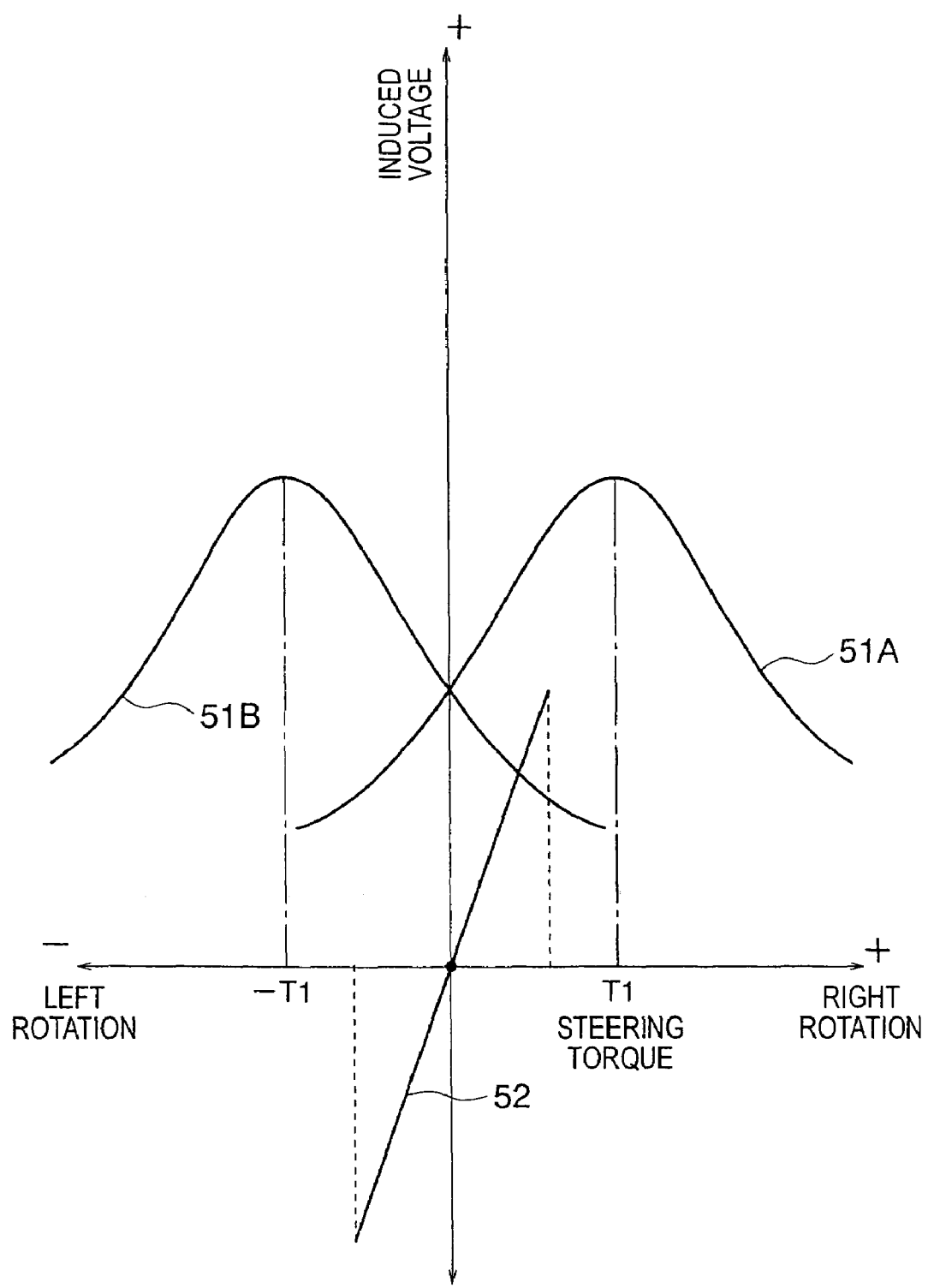
FIG. 4 is a graph showing the magnetostrictive characteristic curves for the sensor coils and the sensing characteristics in the magnetostrictive torque sensor.

Convex magnetostrictive characteristic curves 51A, 51B as shown in FIG. 4, described later, are obtained for each of the two sensor coils 13A, 13B. The magnetostrictive characteristic curves 51A, 51B correspond to the changing characteristics of the induced voltages, which are the sensor outputs from the sensor coils 13A, 13B, respectively.

The steering torque sensor 20 calculates the difference between the induced voltages outputted from the two sensor coils on the basis of the two magnetostrictive characteristic curves 51A, 51B, and senses the rotational direction (to the right or left) and the extent of the steering torque applied to the steering shaft 21, depending on the sign and size of the calculated value.

Torsion occurs in the steering shaft 21 when steering torque acts on the steering shaft 21. As a result, a magnetostrictive effect is created in the magnetostrictive films 14A, 14B. Since an exciting electric current is constantly supplied to the excitation coil 12 from the AC power source 16 in the steering torque sensor 20, the change in the magnetic field resulting from the magnetostrictive effect in the magnetostrictive films 14A, 14B is sensed by the sensor coils 13A, 13B as a change in the induced voltages $V_A$, $V_B$. According to the steering torque sensor 20, the difference between the two induced voltages $V_A$, $V_B$ is outputted as a detected voltage value on the basis of the change in the induced voltages $V_A$, $V_B$. Therefore, the direction and extent of the steering torque (T) applied to the steering shaft 21 can be sensed based on the outputted voltage ($V_A$-$V_B$) of the steering torque sensor 20.

FIG. 4 will now be further described in detail. FIG. 4 is a view showing the magnetostrictive characteristic curves 51A, 51B of the two magnetostrictive films 14A, 14B, respectively, as previously described. In FIG. 4, the horizontal axis represents the steering torque applied to the steering shaft 21, wherein the positive side (+) corresponds to right rotation, while the negative side (−) corresponds to left rotation. The vertical axis in FIG. 4 represents a voltage axis.

The magnetostrictive characteristic curves 51A, 51B for the magnetostrictive films 14A, 14B simultaneously show the sensor output characteristics of the sensor coils 13A, 13B. Specifically, an exciting alternating electric current is supplied by the common excitation coil 12 to the magnetostrictive films 14A, 14B that have the magnetostrictive characteristic curves 51A, 51B; and the sensor coils 13A, 13B respond to this exciting alternating electric current by outputting induced voltages. Therefore, the changing characteristics of the induced voltages of the sensor coils 13A, 13B correspond to the magnetostrictive characteristic curves 51A, 51B of the magnetostrictive films 14A, 14B. In other words, the magnetostrictive characteristic curve 51A shows the changing characteristics of the induced voltage $V_A$ outputted from the sensor coil 13A, while the magnetostrictive characteristic curve 51B shows the changing characteristics of the induced voltage $V_B$ outputted from the sensor coil 13B.

From another viewpoint, the magnetostrictive characteristic curves 51A, 51B express the change in impedance in the magnetostrictive films 14A, 14B in relation to the applied torque.

According to the magnetostrictive characteristic curve 51A, the value of the induced voltage $V_A$ outputted from the sensor coil 13A increases in a substantially linear fashion as the value of the steering torque changes from negative to positive and approaches the positive steering torque value T1, then peaks when the steering torque reaches the positive value T1, and gradually decreases as the steering torque increases past T1. According to the magnetostrictive characteristic curve 51B, the value of the induced voltage $V_B$ outputted from the sensor coil 13B gradually increases as the value of the steering torque approaches the negative value −T1, then peaks when the steering torque reaches the negative value −T1, and decreases in substantially linear fashion as the steering torque further increases past −T1 and changes from negative to positive.

As shown in FIG. 4, the magnetostrictive characteristic curve 51A pertaining to the sensor coil 13A and the magnetostrictive characteristic curve 51B pertaining to the sensor coil 13B reflect that the magnetostrictive films 14A, 14B are inversely magnetically anisotropic to each other, and have a relationship of substantially linear symmetry about the vertical axis that includes the point where the two magnetostrictive characteristic curves intersect.

The line 52 shown in FIG. 4 indicates a graph that is created based on values obtained in a region that is common to the magnetostrictive characteristic curves 51A, 51B and that has substantially linear characteristics. The values of this line are obtained by subtracting the corresponding values of the magnetostrictive characteristic curve 51B obtained as output voltages of the sensor coil 13B from the values of the magnetostrictive characteristic curve 51A obtained as output voltages of the sensor coil 13A. When the steering torque is zero, the induced voltages outputted from the sensor coils 13A, 13B are equal, and their difference is therefore zero. In the steering torque sensor 20, the line 52 is formed as being a substantially straight line by using the region in the magnetostrictive characteristic curves 51A, 51B that is considered to have a substantially constant slope near the mean point (zero) of the steering torque. The vertical axis in FIG. 4 represents an axis that indicates a zero value of voltage difference for the characteristic graph of the line 52. The line 52, which is a characteristic graph, is a straight line that passes through the origin (0, 0) and lies on the positive and negative sides of both the vertical and horizontal axes. Since the sensor output values of the steering torque sensor 20 are obtained as the difference ($V_A$-$V_B$) between induced voltages outputted from the sensor coils 13A, 13B as previously described, the direction and extent of the steering torque applied to the steering shaft 21 can be sensed based on the used of the straight line 52.

As described above, it is possible to obtain a sensor signal that corresponds to the rotational direction and extent of the steering torque inputted to the steering shaft 21 (rotating shaft 11). The signal is obtained based on the output values of the steering torque sensor 20. Specifically, the rotational direction and extent of the steering torque applied to the steering shaft 21 can be known from the sensor values outputted from the steering torque sensor 20.

In other words, the sensor values of the steering torque sensor 20 are outputted as any of the points on the vertical line 52 according to the steering torque. The steering torque is determined to be rotating to the right when the sensor value is on the positive side of the horizontal axis, and the steering torque is determined to be rotating to the left when the sensor value is on the negative side of the horizontal axis. The absolute value of the sensor value on the vertical axis is the extent of the steering torque. Thus, it is possible to sense the steering torque on the basis of the output voltage values of the sensor coils 13A, 13B by using the characteristics of the vertical line 52.

Figure 13:
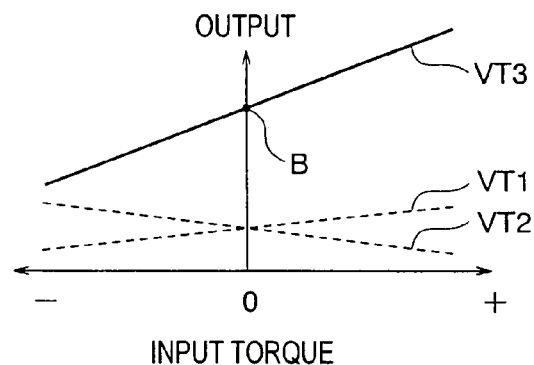
FIG. 13 is a graph showing the input torque/output characteristics for describing the principle of input torque sensing in the configuration of a magnetostrictive torque sensor.
Figure 14:
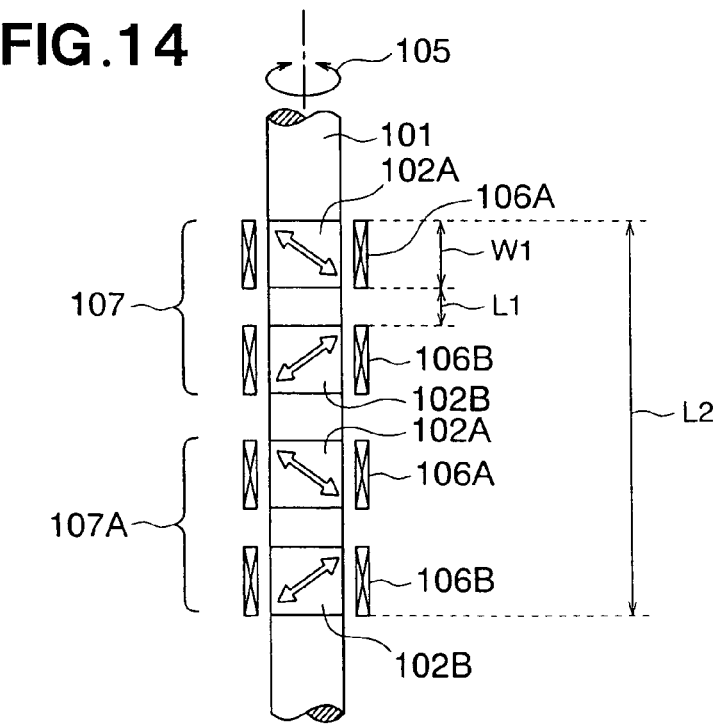
FIG. 14 is a side view of a magnetostrictive torque sensor devised as an example for resolving problems of the prior art.

When the graphs 51A, 51B, and 52 in FIG. 4 are compared with the previously described characteristics VT1, VT2, and VT3 shown in FIG. 13, the magnetostrictive characteristic curves 51A and 51B correspond with the characteristics VT1 and VT2, respectively, and the vertical line 52 corresponds with the characteristic VT3.

Figure 5:
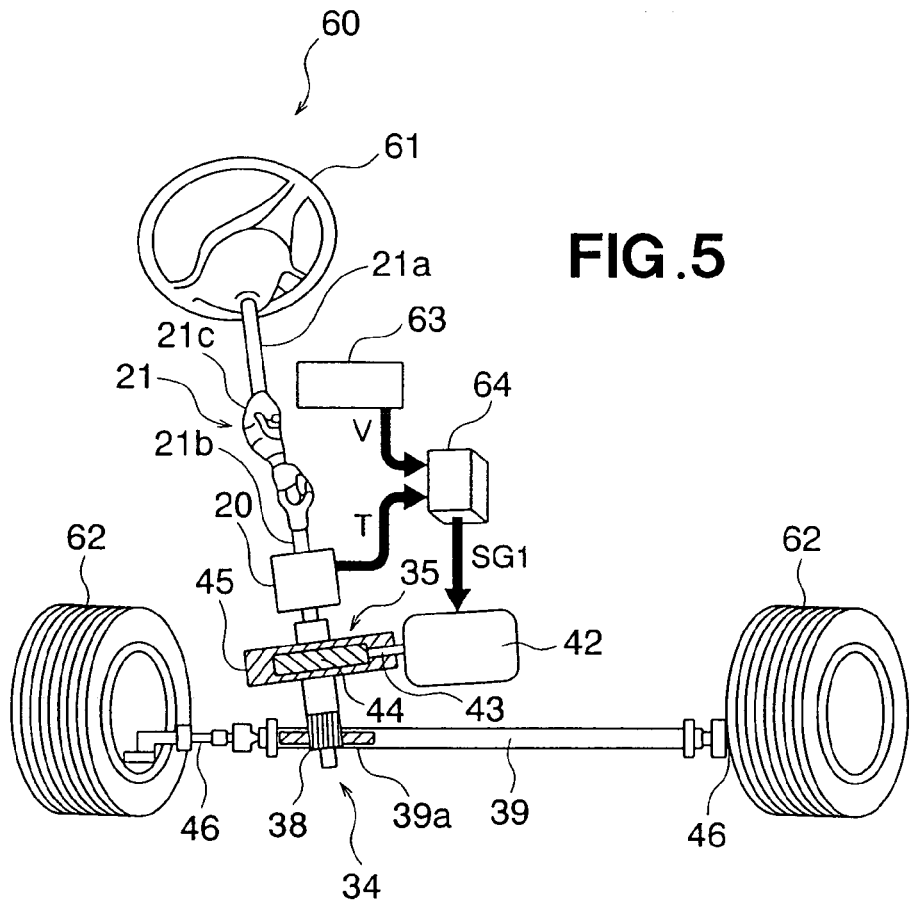
FIG. 5 is a graph showing the entire configuration of an electrically powered steering apparatus wherein the magnetostrictive torque sensor according to the present invention is incorporated as a steering torque sensor.

The following is a schematic description, made with reference to FIG. 5, of the general configuration and operation of an electrically powered steering apparatus mounted in an automobile, and this description correlates to the structure in FIG. 3. Elements in FIG. 5 that are substantially identical to elements described in FIG. 3 are denoted by the same numerical symbols.

An electrically powered steering apparatus 60 is configured so as to provide an auxiliary steering force (steering torque) to the steering shaft 21 that is connected to a steering wheel 61. The steering shaft 21 is configured from an upper steering shaft 21a whose top end is connected to the steering wheel 61, a lower steering shaft 21b whose bottom end is provided with a pinion gear 38, and a swivel coupling 21c that connects the upper and lower steering shafts 21a, 21b. The pinion gear 38 of the lower steering shaft 21b has a rack shaft 39 provided with a rack gear 39a that meshes with the pinion gear. The rack-and-pinion mechanism 34 is formed by the pinion gear 38 and the rack shaft 39 (rack gear 39a). Tie rods 46 are provided at both ends of the rack shaft 39, and front wheels 62 are attached to the outer ends of the tie rods 46.

The electric motor 42 is provided to the lower steering shaft 21b via the power transmission mechanism 35. The power transmission mechanism 35 is formed by the worm gear 44 and the worm wheel 45. The electric motor 42 outputs a rotational force (torque) that supplements the steering torque, and this rotational force is applied to the lower steering shaft 21b by means of the power transmission mechanism 35.

The steering torque sensor 20 is provided to the lower steering shaft 21b. The steering torque sensor 20 senses the steering torque applied to the steering shaft 21 when the driver operates the steering wheel 61 and applies steering torque to the steering shaft 21.

The steering shaft 21 shown in FIG. 3 strictly represents the lower steering shaft 21b, as is made clear in the above description.

The numerical symbol 63 denotes a vehicle speed sensor for sensing the speed of the automobile, and 64 denotes a control apparatus configured from a computer. The control apparatus 64 receives a steering torque signal T outputted from the steering torque sensor 20 and a speed signal V outputted from the vehicle speed sensor 63, and outputs a drive control signal SG1 for controlling the operation of the electric motor 42 on the basis of information pertaining to the steering torque and information pertaining to the vehicle speed. The control apparatus 64 is also equipped with a functional unit for a failure detector 18. Therefore, three voltage signals ($V_A$, $V_B$, $V_C$) from the steering torque sensor 20 are inputted to the control apparatus 64.

The electrically powered steering apparatus 60 comprises the steering torque sensor 20, the vehicle speed sensor 63, the control apparatus 64, the electric motor 42, the rack-and-pinion mechanism 34, and other such components added to the device structure of a regular steering system.

When the driver operates the steering wheel 61 to change the direction in which the vehicle is traveling, the rotational force based on the steering torque applied to the steering shaft 21 is converted by the rack-and-pinion mechanism 34 into linear motion in the axial direction of the rack shaft 39, and the traveling direction of the front wheels 62 is changed via the tie rods 46. At this time, the steering torque sensor 20 provided to the lower steering shaft 21b simultaneously senses the steering torque according to the driver's steering of the steering wheel 61, converts the steering torque into an electrical steering torque signal T, and outputs the steering torque signal T to the control apparatus 64. The speed sensor 63 senses the vehicle speed, converts the speed into a speed signal V, and then outputs this speed signal V to the control apparatus 64. The control apparatus 64 produces a motor electric current for driving the electric motor 42 on the basis of the steering torque signal T and the speed signal V. The electric motor 42 driven by the motor electric current applies an auxiliary steering force to the lower steering shaft 21b via the power transmission mechanism 35. The steering force applied by the driver to the steering wheel 61 is reduced by driving the electric motor 42 as described above.

Furthermore, in the control apparatus 64, failures in the magnetostrictive films 14A, 14B are detected, as will be described later, by the failure detector 18 that executes the failure-detecting function.

Figure 6:
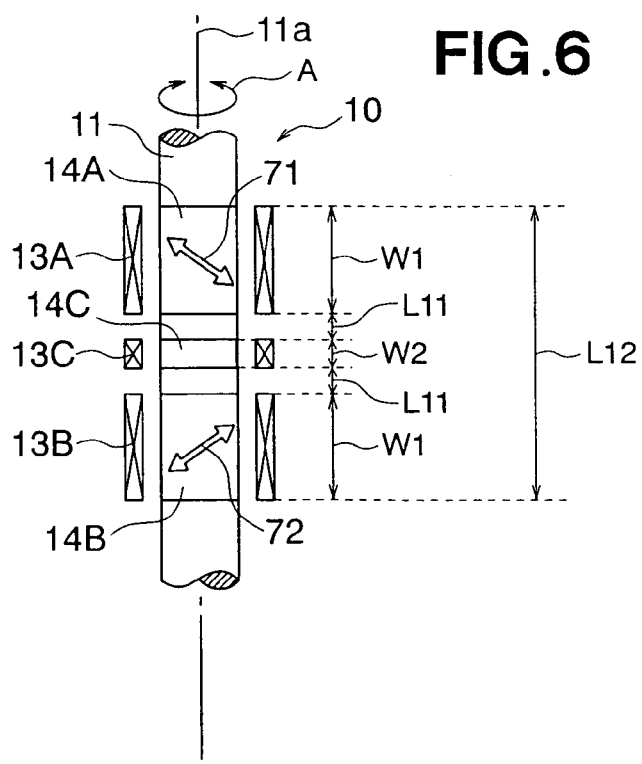
FIG. 6 is a side view in which only the positional relationship of mounting the magnetostrictive films and the sensor coils is selectively shown as part of the configuration of the magnetostrictive torque sensor shown in FIG. 1.

Next, a characteristic configuration of the magnetostrictive torque sensor 10 according to the present invention will be described with reference to FIGS. 6 through 9. FIG. 6 is a side view of the configuration of the magnetostrictive torque sensor 10 shown in FIG. 1, and selectively showing in exaggerated form the positional relationship of mounting the magnetostrictive films 14A, 14B, 14C and the sensor coils 13A, 13B, 13C as being extracted and exaggerated.

In FIG. 6, elements that were described in FIG. 1 are denoted by the same numerical symbols. The width dimension of the magnetostrictive films 14A, 14B in FIG. 6 is denoted by W1, the width dimension of the magnetostrictive film 14C is denoted by W2, the gaps between the magnetostrictive films 14A, 14B and the magnetostrictive film 14C are denoted by L11, and the entire length in the axial direction is denoted by L12. In FIG. 6, the arrow 71 indicates the direction of the magnetic anisotropy provided to the magnetostrictive film 14A, and the arrow 72 indicates the direction of the magnetic anisotropy provided to the magnetostrictive film 14B.

In the magnetostrictive films 14A, 14B, 14C made by plating an Ni—Fe alloy in the configuration shown in FIG. 6, the Fe content of the alloy in the magnetostrictive films 14A, 14B is 30 to 40 wt %, and the Fe content of the alloy in the magnetostrictive film 14C is 15 to 25 wt %, or more preferably 16 to 23 wt %. The reasons for this are as follows.

Changes in the saturation magnetostrictive constant ($\lambda s$) and other factors in relation to changes in the Fe content of the Ni—Fe alloy will now be described with reference to Table 1 shown below, and the Fe content and sensor sensitivity will be described with reference to Table 2.

TABLE 1

| Fe | $\lambda s$ | $\mu$ | $\sqrt{\mu \times \lambda s}$ |
|---|---|---|---|
| 10 | −8 | 250 | 126.4911 |
| 15 | −2 | 1600 | 80 |
| 20 | 0.3 | 4000 | 18.97367 |
| 25 | 3 | 2200 | 140.7125 |
| 30 | 19 | 1900 | 828.1908 |
| 40 | 25 | 1400 | 935.4143 |
| 50 | 22 | 1100 | 729.6575 |
| 60 | 15 | 650 | 382.4265 |

In Table 1, the first column shows the Fe concentration (wt %) of the Ni—Fe alloy (magnetostrictive film). Eight levels of this concentration from 10 to 60 are shown. The "$\lambda s$" in the second column represents the saturation magnetostrictive constant, and the numerical values shown in this column are "$\times 10^{-6}$." The saturation magnetostrictive constant refers to the rate of change in length ($\delta L/L$) when a magnetic field H is applied. Conversely, this data corresponds to the magnetic field H created in the magnetostrictive films when the length is changed by $\delta L$. The "$\mu$" in the third column represents magnetic permeability (H/m). The values in the table refer to the magnetic permeability of the material when the magnetic permeability in a vacuum is set to 1, and are proportionate to the magnetic flux that can be transmitted in the same magnetic field H. The "$\sqrt{\mu \times \lambda s}$" in the fourth column represents the material potential when used in a torque sensor, and this potential corresponds to the ideal sensor output in the case of a torque sensor.

Figure 7:
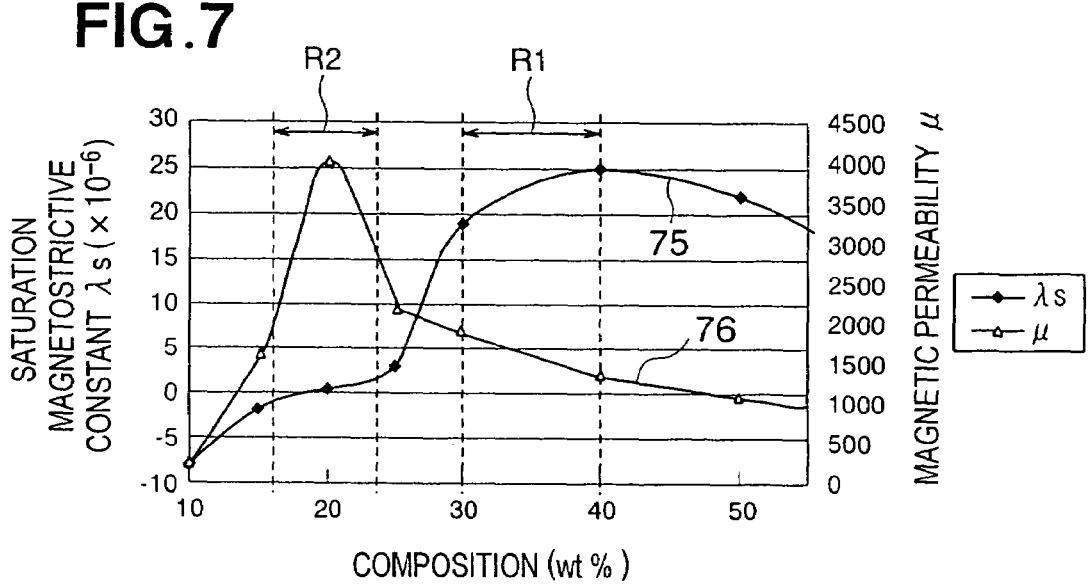
FIG. 7 is a graph showing the saturation magnetostrictive constant ($\lambda$s) and the magnetic permeability ($\mu$) in relation to the Fe content of a magnetostrictive film made of an Ni—Fe alloy.
Figure 8:
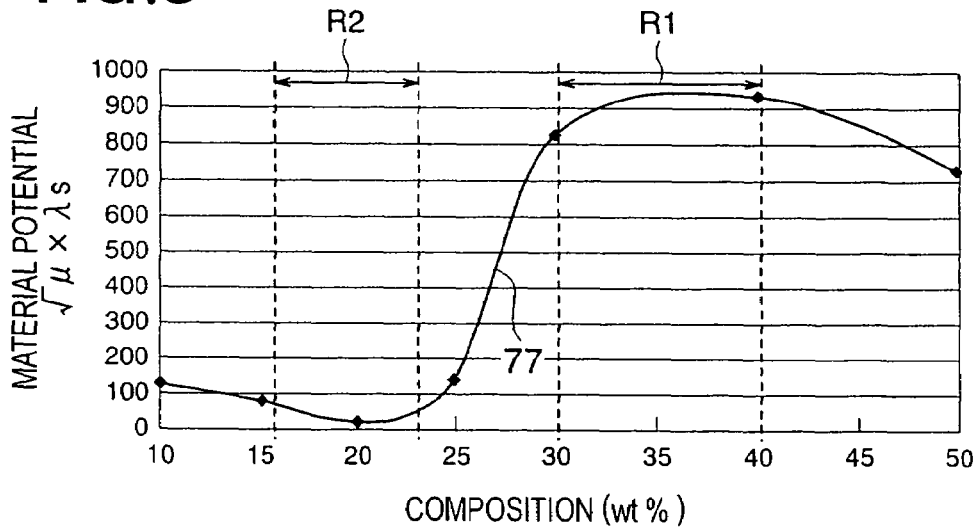
FIG. 8 is a graph showing material potential in relation to the Fe content of a magnetostrictive film made of an Ni—Fe alloy.

The graphs 75, 76 shown in FIG. 7 are obtained when the saturation magnetostrictive constant $\lambda s$ (left vertical axis) and the magnetic permeability $\mu$ (right vertical axis) are plotted in relation to the Fe content (horizontal axis) according to Table 1. The graph 77 shown in FIG. 8 is obtained when the material potential is plotted in relation to the Fe composition (horizontal axis) according to Table 1.

TABLE 2

| Fe composition wt % | Sensitivity | Rate of change in sensitivity |
|---|---|---|
| 20 | 0.04% | 0.006 |
| 24 | 0.24% | 0.035 |
| 27 | 1.07% | 0.156 |
| 31 | 6.75% | 0.978 |
| 35 | 6.90% | 1.000 |
| 40 | 6.08% | 0.882 |
| 44 | 5.72% | 0.829 |

In Table 2, the first column shows the concentration (wt %) of Fe in the Ni—Fe alloy (magnetostrictive film). Seven numerical values of this concentration from 20 to 44 are shown. The second column shows the sensor sensitivity. The sensor sensitivity is defined as "$\Delta Z/Z$," wherein $\Delta Z$ is the change in impedance when a torque of 10 N m is applied, and Z is the impedance value before torque is applied. The third column shows the numerical value of the rate of change in sensitivity.

Figure 9:
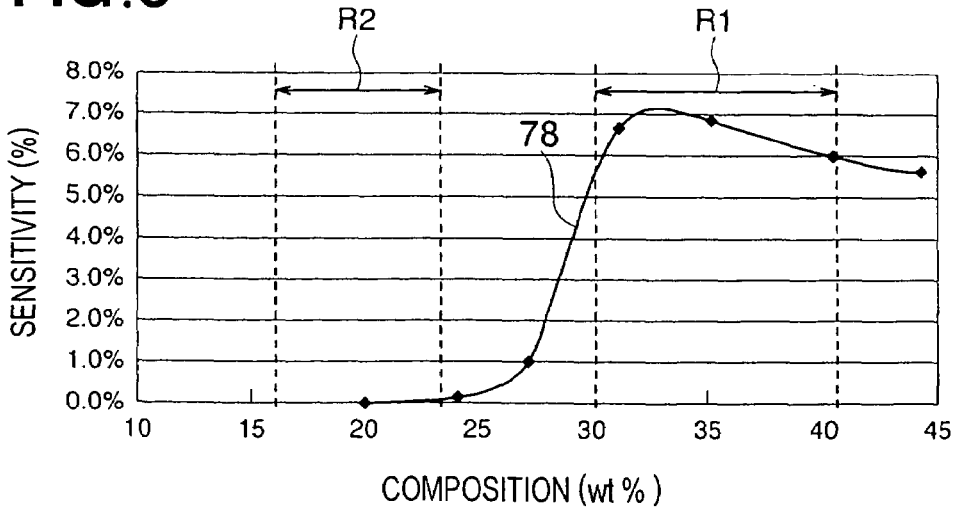
FIG. 9 is a graph showing sensor sensitivity in relation to the Fe content of a magnetostrictive film made of an Ni—Fe alloy.

The graph 78 shown in FIG. 9 is obtained when the sensor sensitivity is plotted in relation to the Fe content (horizontal axis) according to Table 2.

Ideally, the failure-detecting magnetostrictive film 14C that is positioned between the magnetostrictive films 14A, 14B has a sensitivity range of about 0.2% or less. Therefore, an Fe concentration of 15 to 25 wt %, or more preferably 16 to 23 wt %, is selected as described above, based on Tables 1 and 2 and on the graphs 75 through 78. The Fe concentration of 15 to 25% is set as the range R2 in the graphs 75 through 78. The intermediately positioned magnetostrictive film 14C can thereby be made to have a fixed resistance that has the same temperature characteristics as the magnetostrictive films 14A, 14B. The Fe content of the alloy in the magnetostrictive films 14A, 14B is 30 to 40 wt %, and this range is set as the range R1 in the graphs 75 through 78.

There is no change in the impedance of the magnetostrictive film 14C when input torque is applied to the rotating shaft 11, and the output voltage is constant in relation to the measured impedance value outputted to the magnetostrictive film 14C from the sensor coil 15C. The magnetostrictive films 14A, 14B, 14C all have the same temperature characteristics because the temperature characteristics are constant irrespective of the Ni—Fe alloy composition.

Whereas the width W1 of the magnetostrictive films 14A, 14B in the configuration shown in FIG. 6 is, e.g., 18 mm, the width W2 of the magnetostrictive film 14C can be set smaller. The reason for this is that since the magnetostrictive film 14C is needed to function only as a fixed resistance that is not required to have torque-induced output changes, there is no need for a substantial increase in the width of the magnetostrictive film. In the present embodiment, the magnetostrictive film 14C is set to about 4 mm, for example. The intermediately positioned magnetostrictive film 14C can be made even smaller by devising the appropriate manufacturing steps.

The space between the top and bottom torque-sensing magnetostrictive films 14A, 14B should be kept at about 8 mm, so that the films do not affect each other. Therefore, in the present embodiment, gaps L11 of about 3 mm are formed between the magnetostrictive films 14A, 14B and the magnetostrictive film 14C. As a result, the entire length L12 from the top end of the upper magnetostrictive film 14A to the bottom end of the lower magnetostrictive film 14B is 46 mm. This is a small length equal to about half the length of 96 mm in the conventional sensor previously described. The sensor can thereby be applied to a short rotating shaft 11; i.e., a short steering shaft.

The following is a description, made with reference to FIGS. 10A through 10C and FIG. 11, of the configuration of the aforementioned failure detector 18; i.e., of the method of detecting failures in the magnetostrictive torque sensor 10 according to the present embodiment.

Figures 10A, 10B, 10C:
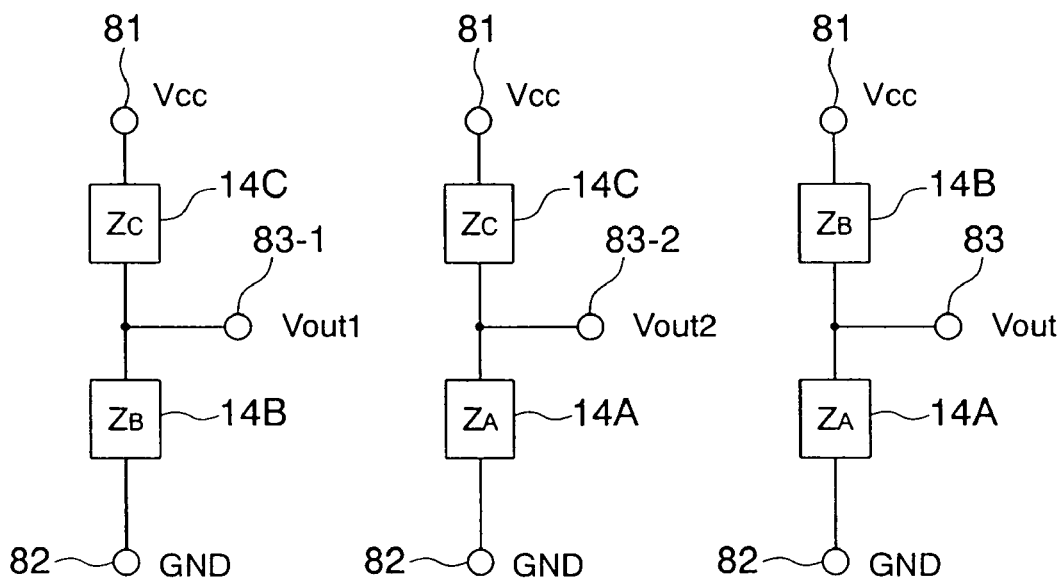
FIGS. 10A through 10C are electric circuit diagrams showing detection circuits provided in a failure detector.

In FIGS. 10A through 10C, three circuits are shown so as to simplify the comparison. These circuits are formed inside the failure detector 18. These circuits are configured based on sensor signals outputted from the sensor coils 13A, 13B, 13C. The signal outputted from the sensor coil 13A is a signal for sensing impedance changes in the magnetostrictive film 14A. Therefore, the impedance of the magnetostrictive film 14A is denoted by "$Z_A$" in FIGS. 10A through 10C. The signal outputted from the sensor coil 13B is a signal for sensing impedance changes in the magnetostrictive film 14B. Therefore, the impedance of the magnetostrictive film 14B in FIGS. 10A through 10C is denoted as "$Z_B$". The signal outputted from the sensor coil 13C is a signal for sensing impedance changes in the magnetostrictive film 14C. Therefore, the impedance of the magnetorestictive film 14C in FIGS. 10A through 10C is denoted as "$Z_C$."

Furthermore, in the three electric circuits shown in FIGS. 10A through 10C, the terminal 81 is a power source terminal (Vcc), the terminal 82 is a ground terminal (GND), and the terminals 83, 83-1, and 83-2 are output terminals. The outputs of the terminals 83, 83-1, and 83-2 in each of the three electric circuits are "V out," "V out 1," and "V out 2," respectively.

When the manner in which the characteristics vary in relation to input torque (N m) is tabulated for each of the impedances $Z_A$, $Z_B$, and $Z_C$, the result is the following Table 3.

TABLE 3

| Torque (N m) | $Z_A$ | $Z_B$ | $Z_C$ |
|---|---|---|---|
| −20 | 270 | 330 | 300 |
| −10 | 285 | 315 | 300 |
| 0 | 300 | 300 | 300 |
| 10 | 315 | 285 | 300 |
| 20 | 330 | 270 | 300 |

Figure 11:
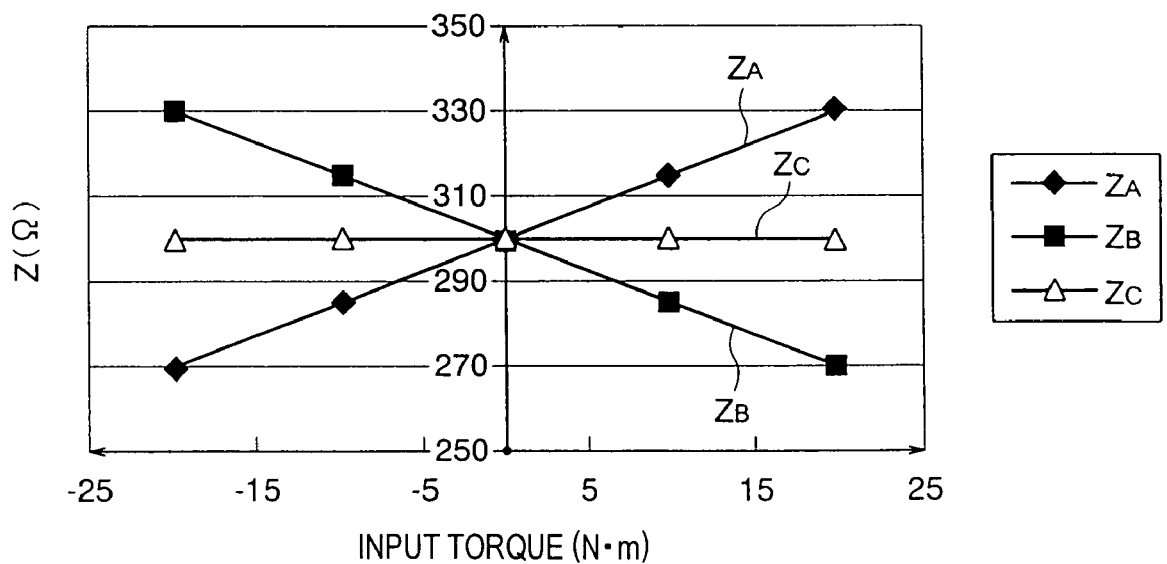
Figure 12:
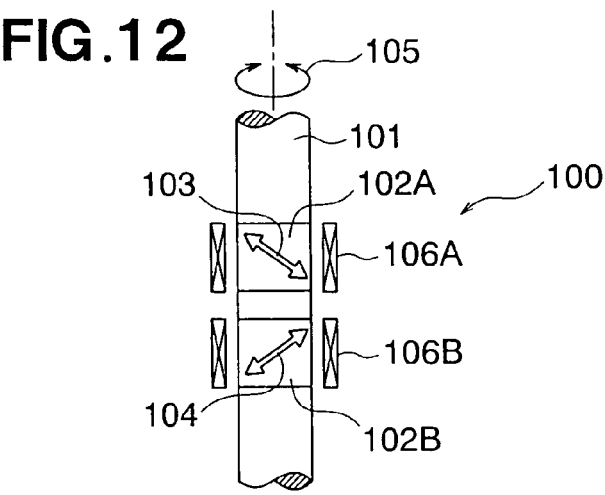
FIG. 12 is a side view showing the main configuration of a common conventional magnetostrictive torque sensor.

When the manner in which the characteristics vary in relation to input torque (N m) is plotted for each of the impedances $Z_A$, $Z_B$, and $Z_C$, the result is shown in FIG. 11.

In the above description, in principle, the electric circuit shown in FIG. 10C outputs a signal (V out) for sensing the input torque applied to the rotating shaft 11 by using the impedances $Z_A$, $Z_B$ of the magnetostrictive films 14A, 14B. The electric circuit shown in FIG. 10A outputs a signal (V out 1) for detecting failures in the magnetostrictive films 14B, 14C by using the impedances $Z_B$, $Z_C$ of the magnetostrictive films 14B, 14C. Furthermore, the electric circuit shown in FIG. 10B outputs a signal (V out 2) for detecting failures in the magnetostrictive films 14A, 14C by using the impedances $Z_A$, $Z_C$ of the magnetostrictive films 14A, 14C.

In practice, failures in the magnetostrictive films 14A, 14B, 14C are determined by sensing the states of the output signals "V out," "V out 1," and "V out 2" as follows.

When "V out" changes, "V out 1" is constant, and "V out 2" changes, the magnetostrictive film 14A is determined to have failed.

When "V out" changes, "V out 1" changes, and "V out 2" is constant, the magnetostrictive film 14B is determined to have failed.

When "V out" is constant, "V out 1" changes, and "V out 2" changes, the magnetostrictive film 14C is determined to have failed.

As described above, it is possible to determine whether the magnetostrictive films 14A through 14C are in a normal state, or whether any of the magnetostrictive films 14A through 14C are in an abnormal state, according to the combination of states of the output signals "V out," "V out 1," and "V out 2."

The configurations, shapes, sizes, materials, and arrangement relationships described in the above embodiments are merely schematic depictions that allow the present invention to be understood and implemented. The present invention is therefore not limited to the described embodiments, and it is possible to make various modifications that do not deviate from the scope of the technological ideas presented in the claims.

For example, the magnetostrictive film 14C need not be positioned between the magnetostrictive films 14A and 14B, and can be disposed at any position on the surface of the rotating shaft 11 where the film will not hinder other mechanisms (for example, the bearings of the electrically powered steering apparatus or the like).

Obviously, various minor changes and modifications of the present invention are possible in light of the above teaching. It is therefore to be understood that within the scope of the appended claims the invention may be practiced otherwise than as specifically described.

What is claimed is:

1. A magnetostrictive torque sensor comprising:
   a rotating shaft that is rotated by application of a torque;
   a first magnetostrictive film formed around an entire circumferential periphery of a surface of the rotating shaft;
   a second magnetostrictive film formed around an entire circumferential periphery of the surface of the rotating shaft;
   a third magnetostrictive film having a different alloy composition than the first magnetostrictive film and the second magnetostrictive film and being formed around an entire circumferential periphery of the surface of the rotating shaft;
   a first sensor coil for sensing impedance of the first magnetostrictive film;
   a second sensor coil for sensing impedance of the second magnetostrictive film;
   a third sensor coil for sensing impedance of the third magnetostrictive film;

torque calculating means for outputting a signal according to a change in impedance outputted from the first through third sensor coils, and calculating the torque applied to the rotating shaft on the basis of an output signal of the first sensor coil and an output signal of the second sensor coil; and failure sensing means for comparing the output signals of the first through third sensor coils and detecting failures in the first magnetostrictive film or the second magnetostrictive film.

2. The magnetostrictive torque sensor of claim 1, wherein the first through third magnetostrictive films are formed from an Ni—Fe alloy, the Fe content of the alloy in the first magnetostrictive film and the second magnetostrictive film is 30 to 40 wt %, and the Fe content of the alloy in the third magnetostrictive film is 15 to 25 wt %.

3. The magnetostrictive torque sensor of claim 1, wherein the third magnetostrictive film has a width smaller than a width of the first magnetostrictive film or a width of the second magnetostrictive film.

4. An electrically powered steering apparatus comprising:

a steering shaft;

a magnetostrictive torque sensor provided on the steering shaft for sensing a steering torque applied to the steering shaft, said magnetostrictive torque sensor having a first magnetostrictive film formed around an entire circumferential periphery of a surface of the steering shaft, a second magnetostrictive film formed around an entire circumferential periphery of the surface of the steering shaft, a third magnetostrictive film having a different alloy composition than the first magnetostrictive film and second magnetostrictive film and being formed around an entire circumferential periphery of the surface of the steering shaft, a first sensor coil for sensing impedance of the first magnetostrictive film, a second sensor coil for sensing impedance of the second magnetostrictive film, a third sensor coil for sensing impedance of the third magnetostrictive film, torque calculating means for inputting a signal according to a change in impedance outputted from the first through third sensor coils, and calculating the torque applied to the rotating shaft on the basis of an output signal of the first sensor coil and an output signal of the second sensor coil, and failure sensing means for comparing the output signals of the first through third sensor coils and detecting failures in the first magnetostrictive film or the second magnetostrictive film;

an electric motor for providing an auxiliary steering force to the steering shaft according to the steering torque sensed by the magnetostrictive torque sensor; and control means for controlling the driving of the electric motor on the basis of a signal pertaining to the steering torque sensed by the magnetostrictive torque sensor.

5. The electrically powered steering apparatus of claim 4, wherein the first through third magnetostrictive films in the magnetostrictive torque sensor are formed of an Ni—Fe alloy, the Fe content of the alloy in the first magnetostrictive film and the second magnetostrictive film is 30 to 40 wt %, and the Fe content of the alloy in the third magnetostrictive film is 15 to 25 wt %.

6. The electrically powered steering apparatus of claim 4, wherein the third magnetostrictive film in the magnetostrictive torque sensor has a width smaller than a width of the first magnetostrictive film or a width of the second magnetostrictive film.

* * * * *